United States Patent Office 2,694,030
Patented Nov. 9, 1954

2,694,030

STABILIZED 1-SULFANILYL-2-THIOUREA

Robert Behnisch, Wuppertal-Elberfeld, Germany, assignor to Schenley Industries, Inc., New York, N. Y., a corporation of Delaware No Drawing. Application February 12, 1951,
Serial No. 210,633

Claims priority, application Germany February 20, 1950

2 Claims. (Cl. 167—51.5)

This invention relates generally to novel therapeutically useful agents and, more particularly, it is concerned with aqueous solutions, suitable for use in otiatrics, which contain a high concentration of 1-sulfanilyl-2-thiourea and which are characterized by an absence of tendency to crystallize when stored at low temperatures.

It is well known that the relative insolubility in water of aqueous solutions of 1-sulfanilyl-2-thiourea materially limits the field of usefulness of this therapeutic agent. Various expedients have been devised in the past to effect a combination between this agent and a substance capable of improving its solubility in water or aqueous mixtures without inhibiting or diminishing the therapeutic potency of the material. One such expedient was to form the diethanol-amine salt of 1-sulfanilyl-2-thiourea which may be used in preparing highly concentrated, substantially neutral, aqueous solutions in which the 1-sulfanilyl-21thiourea retains its full potency as a therapeutic agent. These solutions however, have the disadvantage that upon cooling, and especially upon storage over a substantial period of time at a low temperature, the diethanolamine salt of 1-sulfanilyl-2-thiourea separates from the solution as a crystals which may be redissolved only with difficulty. Solutions of the N-methylglucamine (1-methyl-amino-hexane - 2.3.4.5.6 - pentol) salt of 1 - sulfanilyl - 2-thiourea are unsuitable for use in the formulation of compositions for use in otiatrics because the high molecular weight of the N-methyl-glucamine causes the product to have so high a molecular weight that solutions having a high content of 1-sulfanilyl-2-thiourea have too high a viscosity for satisfactory use. It will be understood that when reference is made herein to concentrated solutions of 1-sulfanilyl-2-thiourea suitable for use in otiatrics, it is meant that the solutions have an available content of 50 percent by weight or more of this substance based on total weight of the solution.

It is now found, surprisingly, that solutions having a satisfactory viscosity and a high available content of 1-sulfanilyl-2-thiourea suiting them to use in otiatrics, can be readily produced by forming a mixed diethanolamine N-methylglucamine salt of 1-sulfanilyl-2-thiourea wherein the N-methylglucamine is utilized, when preparing the mixed salt, in a proportion of between about 10 and 80 percent of the total amount of N-methylglucamine and diethanolamine used. That is to say, assuming that equimolecular proportions of 1-sulfanilyl-2-thiourea and diethanolamine react to form the diethanolamine salt, the novel mixed amine salt according to this invention would be obtained by replacing 10 percent to 80 percent of the diethanolamine component with a chemically equivalent amount of N-methylglucamine.

The novel products of this invention are produced by dissolving the components in distilled water and filtering the solution to remove any residual impurities that may be present. Solutions produced in this manner, having an available content of 50 per cent, based on the total weight, of 1-sulfanilyl -2- thiourea do not separate, i. e., the solute does not crystallize from the solvent medium, even after standing for several months at temperatures of about —4° C. The solutions are substantially neutral and have good compatibility with body fluids. The 1-sulfanilyl-2-thiourea content of the solution is readily available for therapeutic purposes and is fully active.

To facilitate a better understanding of the subject matter of this invention, a specific example illustrating the preparation of an aqueous solution, suitable for use in otiatrics, of the mixed amine salt of 1-sulfanilyl-2-thiourea will now be describer, but it will be understood that this example is provided by way of illustration of the invention and not by way of limitation upon it.

About 50 grams of 1-sulfanilyl-2-thiourea of therapeutic grade, approximately 6.8 grams of diethanolamine and 30 grams of N-methylglucamine are dissolved in a quantity of distilled water sufficient to yield a solution having a total volume of about 100 cc. This solution, after filtering, is clear, stable and does not deposit crystals even when stored for several months at temperatures of about —4° C. In comparison to this solution, a solution produced by dissolving about 50 grams of 1-sulfanilyl-2-thiourea and 22.7 grams of diethanolamine in distilled water of a volume such that the total volume of the solution is about 100 cc. produces a crystalline precipitate of the diethanolamine salt upon standing for two days at a temperature of about —4° C.

Having thus described the subject matter of this invention what it is desired to secure by Letters Patent is:

1. A chemotherapeutic agent suitable for use in otiatrics, comprising a minimum of 50% by weight of available 1-sulfanilyl-2-thiourea and being characterized by the absence of tendency for the solute to crystallize from the solvent upon prolonged periods of storage at low temperatures, that comprises an aqueous solution of a secondary amine salt of 1-sulfanilyl-2-thiourea wherein the secondary amine moiety consists of a mixture of diethanolamine and N-methylglucamine, the sum of the molecular proportions of the two amines constituting the secondary amine moiety being substantially equal to the molecular proportion of 1-sulfanilyl-2-thiourea present in the solution.

2. A chemotherapeutic agent as defined in claim 1, wherein N-methylglucamine constitutes from 10 percent to 80 percent of the total amount of diethanolamine and of N-methylglucamine constituting the amine moiety of the mixed amine salt.

References Cited in the file of this patent

FOREIGN PATENTS

| Number | Country | Date |
| --- | --- | --- |
| 912,428 | France | Apr. 29, 1946 |
| 604,204 | Great Britain | June 30, 1948 |